United States Patent
Barton et al.

(10) Patent No.: US 6,636,153 B1
(45) Date of Patent: Oct. 21, 2003

(54) SENSING SYSTEM FOR MAGNETIC CLAMPING DEVICES

(76) Inventors: Simon C. Barton, 10805 Martha's Way, Raleigh, NC (US) 27614; Mark Johnson, 160 Nottingham Street, Sheffield S39HL (GB)

(*) Notice: Subject to any disclaimer, the term of this patent is extended or adjusted under 35 U.S.C. 154(b) by 181 days.

(21) Appl. No.: 09/916,009

(22) Filed: Jul. 26, 2001

Related U.S. Application Data
(60) Provisional application No. 60/220,853, filed on Jul. 26, 2000.

(51) Int. Cl.[7] ............................................... G08B 21/00
(52) U.S. Cl. .................... 340/680; 340/679; 340/686.5; 335/244; 335/285; 361/143; 361/144; 294/65.5
(58) Field of Search ................................ 340/680, 679, 340/686.5; 335/244, 245, 284, 285, 295; 361/143, 144, 147, 148; 294/65.5

(56) References Cited

U.S. PATENT DOCUMENTS

| | | | | |
|---|---|---|---|---|
| 4,237,455 A | * | 12/1980 | Beckley et al. | 340/685 |
| 4,585,282 A | * | 4/1986 | Bosley | 308/10 |
| 4,910,633 A | * | 3/1990 | Quinn | 361/144 |
| 5,440,499 A | * | 8/1995 | Rasmussen | 340/679 |
| 6,104,270 A | * | 8/2000 | Elias | 335/289 |
| 6,154,353 A | * | 11/2000 | Bowers et al. | 361/144 |
| 6,489,871 B1 | * | 12/2002 | Barton | 335/285 |

* cited by examiner

*Primary Examiner*—Donnie L. Crosland
(74) *Attorney, Agent, or Firm*—Mills Law Firm PLLC

(57) ABSTRACT

A sensor system for determining acceptable magnetization between a magnetic clamp and a mold patent for a quick mold change system on an injection molding machine includes secondary sensing coils magnetically coupled with a switchable magnet in the clamp effecting a voltage output in accordance with magnetic flux conditions between the magnets and the mold and providing a control signal based on changes in said flux condition for controlling activity of said workpiece in accordance therewith.

31 Claims, 5 Drawing Sheets

FIG. 5
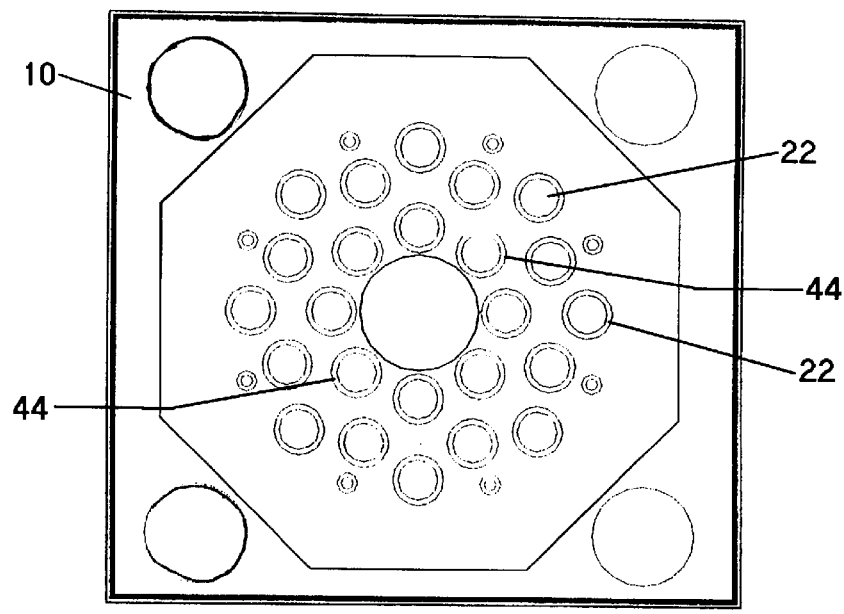
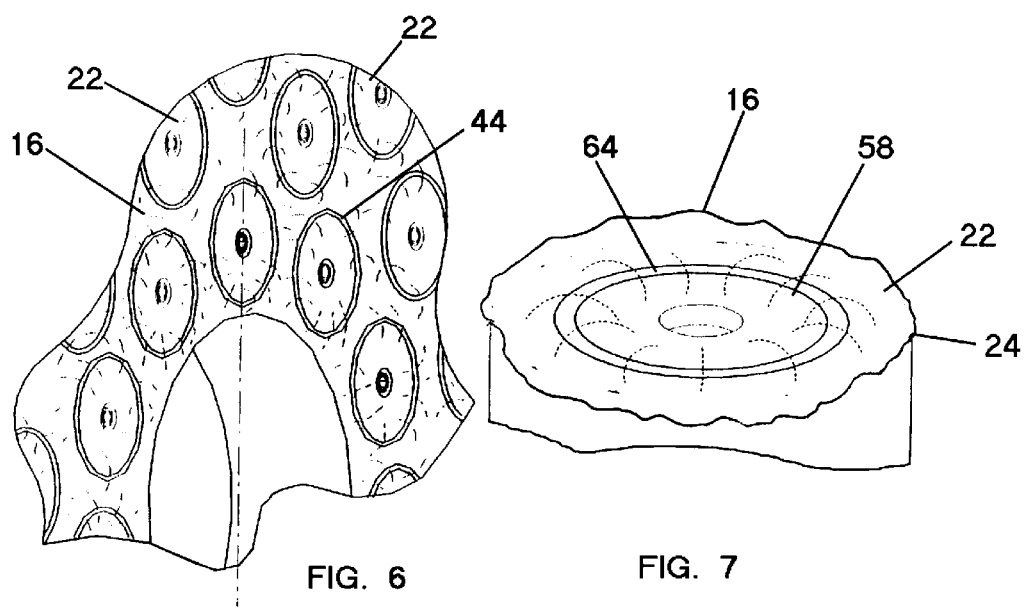
FIG. 6          FIG. 7

SENSING SYSTEM FOR MAGNETIC CLAMPING DEVICES

RELATED APPLICATION

The present invention claims the benefit under 35 USC 121 of U.S. Provisional Application No. 60/220,853 filed on Jul. 26, 2000 in the name of Simon B. Barton et al. and entitled "Sensing System for Magnetic Clamping Devices".

FIELD OF THE INVENTION

The present invention relates to sensors for magnetic clamping systems and, in particular, a sensing system for assuring proper magnetization and continual material contact for magnetic quick mold change systems on injection molding machines.

BACKGROUND OF THE INVENTION

Material handling and manufacturing systems, such as injection molding machines, are generally provided with various sensing systems for assuring that coupling mechanisms are properly engaged for operation thereof to continue. Such systems for mechanically and hydraulically based systems are well established. Recently, magnetic coupling systems have been increasingly used in quick mold change systems for injection molding machines. Magnetic coupling systems have provided a vehicle for minimizing down time and maximizing productivity. The magnetic based quick mold change systems, unlike mechanical and hydraulic systems, do not require extensive modifications to the mold and lend themselves to magnetic clamping with minimal structural modification inasmuch as they may be readily directly coupled with the flat steel bases customarily used for injection molds. Additionally, magnetic clamps have greater clamping accuracy, improved safety, ready accessibility, and low maintenance and energy consumption.

The quick mold change magnetic systems do not use redundant coupling systems, relying solely on the magnetization for maintaining the mold in accurate and functional position. The quoted clamping force for these systems is generally based on a mild steel back-plate of adequate thickness and good surface finish. Under normal operating conditions, the magnetic clamping forces are ample to hold the mold on the mold platen. Certain conditions, however, can arise wherein large forces may transiently occur that have the potential to dislodge the mold. Over-packing the mold or incorrect ejector stroke adjustment, for example, interrupt the magnetic circuits sufficiently for the mold to be released and fall to the bed of the machine. Further, the mold may become warped or covered in rust or dirt, or a foreign body may get trapped between the mold and the chuck. All of the foregoing problems can reduce the applied clamping force of the magnet system. When such conditions occur no adequate provisions are made for detection. Current sensors merely detect problems with electrical supply. Existing proximity probes detect the physical presence of the mold. Neither fully takes into account the magnetic performance of the poles in contact with the mold.

The proximity sensors have been incorporated into the magnetic coupler. In operation, as long as the mold is in contact with the magnetic chuck, the proximity sensors are closed, and operating conditions maintained. In the event the mold separates a predetermined distance from the magnetic chuck, generally 0.2 mm or more, the proximity sensors open and an emergency stop condition is initiated at the machine. Such sensing parameters are not altogether adequate inasmuch as this threshold distance reduces the clamping force significantly and the mold will have already dislodged from its base prior to sensor signal.

A further problem can be introduced by the initial mounting of the mold. Therein, the proximity sensors prevent magnetization unless the mold is positioned within the threshold limit. This preassembly condition is difficult to attain in normal operations. Although not recommended, operators oftentimes increase the proximity switch threshold to permit operation of magnetization circuit. This approach, however, can result in insufficient magnetic coupling for sustained operation. The excessive spacing at time of magnetization prevents the switchable magnets from achieving full saturation, thereby reducing clamping force. Further, the threshold adjustment also increases the amount of tolerable mold movement before establishing the emergency stop condition, further increasing the possibility of mold separation occurring before the emergency signal.

BRIEF SUMMARY OF THE INVENTION

The present invention provides a sensing system providing greater sensitivity to mold separation, reduction in mold mounting alignment conditions, and assurance of magnetic saturation in the coupled condition prior to operation. The sensor system determines acceptable magnetization between a magnetic clamp and a mold patent for a quick mold change system on an injection molding machine. The sensor system includes secondary sensing coils magnetically coupled with a switchable magnet in the clamp for effecting a voltage output in accordance with magnetic flux conditions between the magnets and the mold and providing a control signal based on changes in said flux condition for controlling activity of the workpiece in accordance therewith.

Accordingly, it is an object of the present invention to provide a magnetic coupling system that insures adequate clamping forces for continued operation.

Another object is to provide a sensor system for magnetic clamping devices that detects permeability conditions at the magnetic interface for determining acceptable clamping forces.

A further object of the invention is to provide a magnetic clamping system for quick mold change molding machines that detects deleterious mold movements in order to minimize the risk of the mold falling from the magnetic clamp.

Yet another object of the invention is to provide a sensor system for a clamping device that conditions continued operations based on flux-based movement and permeability detection.

DESCRIPTION OF THE DRAWINGS

The above and other objects and advantages of the present invention will become apparent upon reading the following detailed description of the preferred embodiments taken in conjunction with the accompanying drawings in which:

FIG. 5 is a front elevational view of the magnetic clamp incorporating sensing magnets;

FIG. 6 is a fragmentary perspective view of a magnetic clamp and the sensing magnets; and FIG. 7 is a fragmentary perspective view of the sensor magnet.

DETAILED DESCRIPTION OF THE PREFERRED EMBODIMENTS

Figure 2:
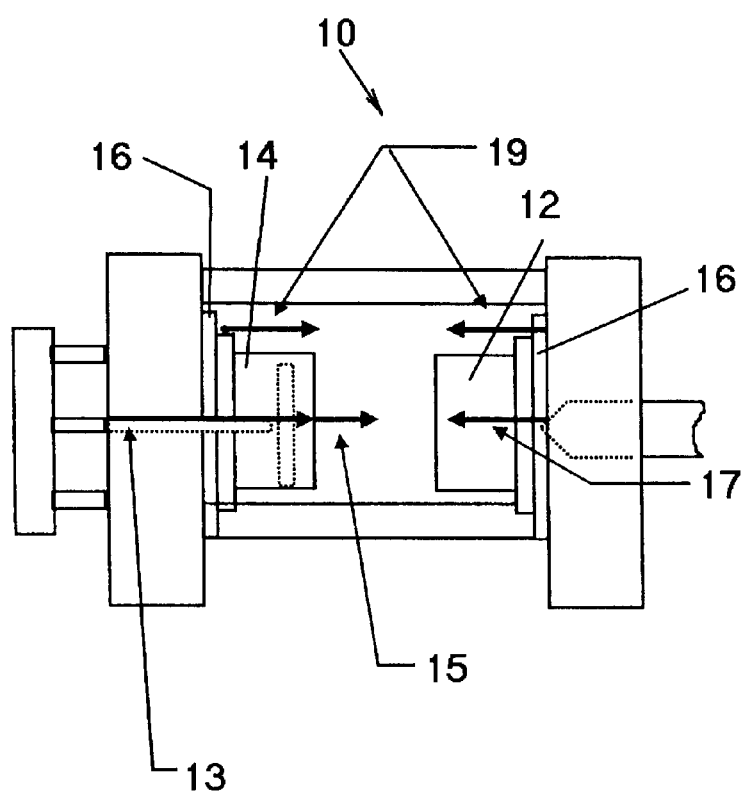
FIG. 2 is a schematic view of the head end of an injection molding machine.

Referring to the drawings for purpose of describing the preferred embodiments of the invention and not for limiting same, FIG. 2 schematically illustrates an injection molding machine 10 having a fixed mold 12 and a movable mold 14 respectively conventionally carried thereon by magnetic quick mold change clamps 16. In conventional operation, many forces work against the holding forces generated by the clamps, i.e. ejector forces 13 due to incorrect machine adjustment, inertial forces 15 during mold closing travel, nozzle pressures 17 and mold opening forces 19. To counteract such effects and other operational aspects generating disruptive magnetic clamping forces, a multiple sensing system as described below is provided at the clamping interfaces. Preferably, the switchable magnets utilized in the sensing system are of the type disclosed in U.S. Ser. No. 09/733,394 filed on Dec. 8, 2000 now U.S. Pat. No. 6,489,871 in the name of Simon C. Barton and entitled "Magnetic Workholding Device", and will be described with reference thereto. It will become apparent, however that the invention may be readily incorporated with magnetic clamping systems of varying types used in coupling workpieces wherein it is desired to avoid continued operation without adequate magnetic clamping forces.

Referring to FIGS. 1, 3 and 5 through 7, each clamp 16 comprises a base plate 20 incorporating a plurality of annular switchable magnetic devices 22 as described in the above referenced application. The coupling surface 24 of the base plate 20 is generally planar and coextensive with the mating surface of the mold 12. However, a single base plate design may handle a family of mold designs of varying configurations, which are not necessarily complementary surfaces, but sufficient to effect adequate magnetic coupling for the molding operation being conducted.

Figure 1:
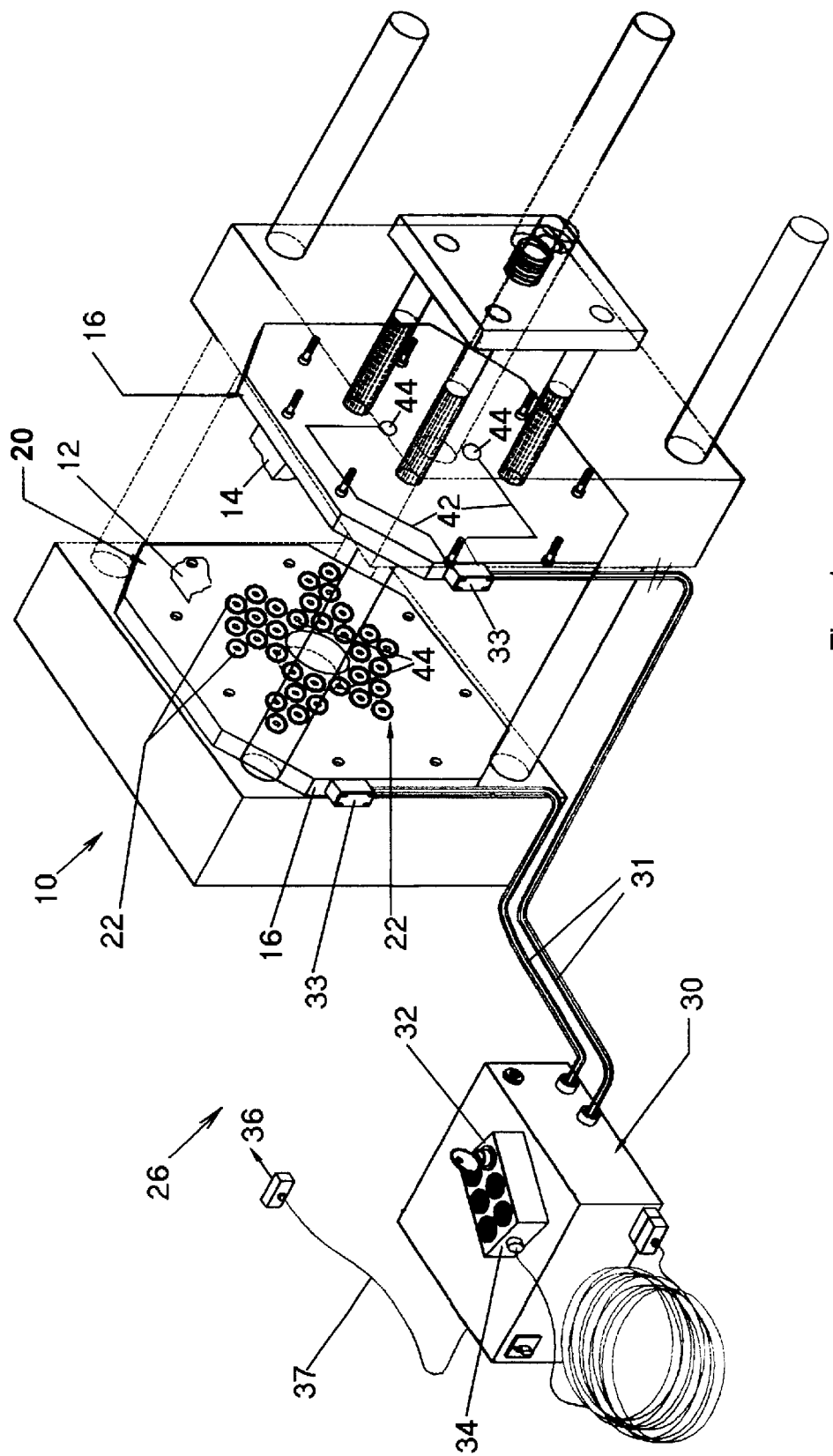
FIG. 1 is a perspective view of a sensing system for a magnetic mold clamp assembly in accordance with the invention.
Figure 3:
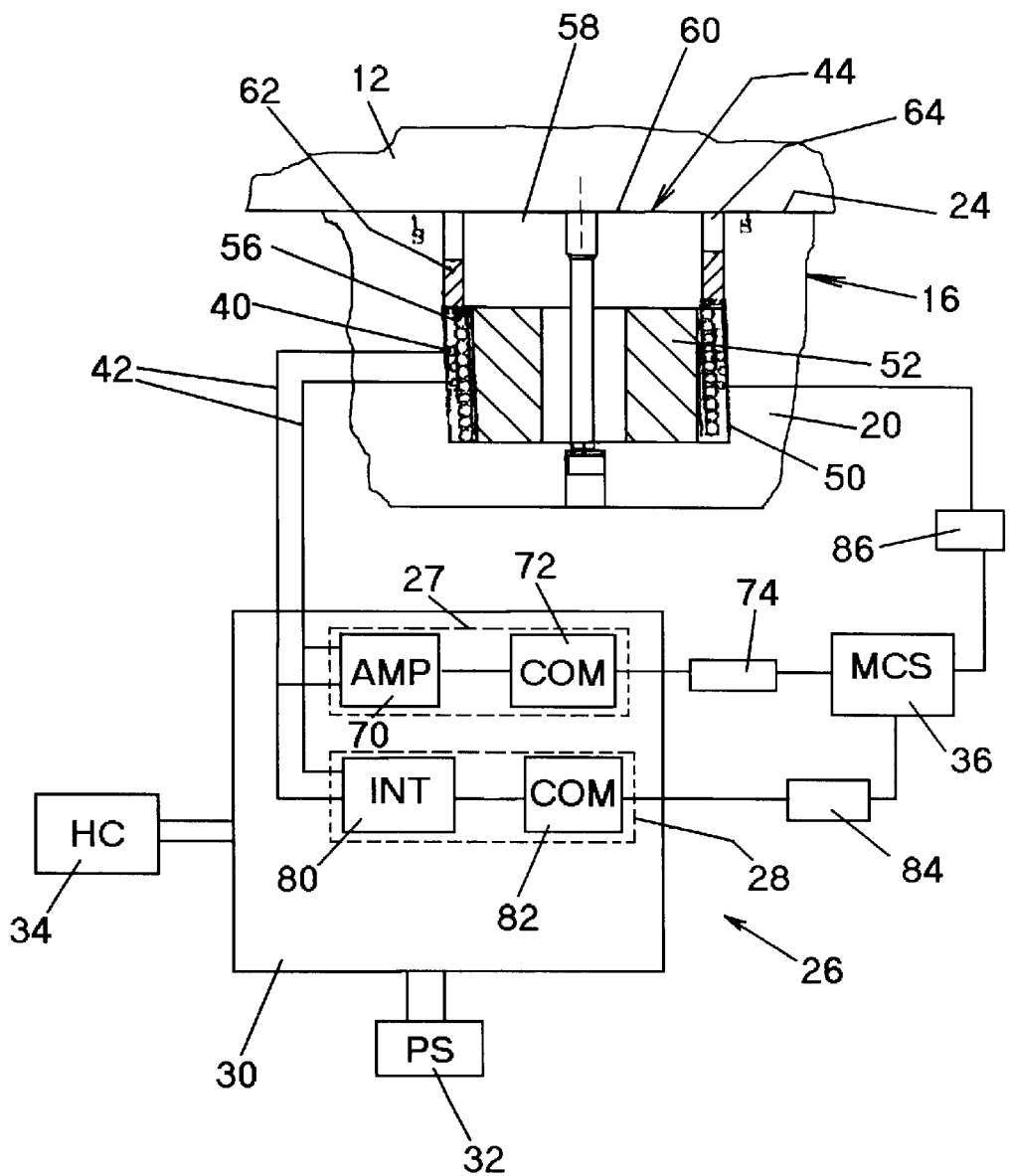
FIG. 3 is a fragmentary view of a switchable magnet coupled with a control system for a sensing system in accordance with the invention.

Referring to FIGS. 1 and 3, a sensing system 26 in accordance with the invention includes a movement sensing system 27 and a permeability sensing system 28, partially housed in a controller 30 connected to a power supply 32, operated by a hand control module 34, and operatively coupled with the clamps 16 by cables 31 at connectors 33. The controller is interfaced with the molding machine control system 36 by cable 37. As described below, the movement sensing system 27 detects motion conditions between the mold and the clamp during molding and prevents operations if excessive movement conditions are detected. The permeability sensing system 28 detects magnetic permeability conditions after magnetization and prevents molding operations from starting if inadequate magnetic conditions are detected.

In the movement sensing system 27, at least two of the switchable magnetic devices 22 are modified by incorporating a secondary or search coil 40 with secondary leads 42 leading to a connector 33 to establish a movement sensor magnet 44. The sensor magnets 44, in their sensing capacity, operate independently or in concert with the other sensor magnets in the clamping modes. The sensor magnets 44 are located on the coupling surface 24 at design locations whereat excessive separation is deemed undesirable. Suitable positions are opposed locations adjacent the mold cavity. Positions just within the area defined by the minimum recommended mold size for the clamp are preferred. Further, a greater number of devices may be employed. Alternatively, the primary coils of the selected sensor magnets may be utilized for this function. Moreover, the search coils may also be located around the inner pole.

More specifically, the sensor magnets 44 are housed in a counterbore 50 formed in the base plate 20 and upwardly opening at the coupling surface 24. The sensor magnet 44 includes a switchable cylindrical magnet 52 coaxially located at the base of the counterbore 50 and surrounded by a primary coil 56 and the secondary coil 40. A circular inner pole 58 of a ferromagnetic material and smaller in diameter than the counterbore is carried atop the magnet 52 and has an upper surface 60 coextensive with the coupling surface 24. An annular permanent magnet 62 is magnetically and mechanically coupled between the inner wall of the counterbore 50 and the inner pole 58. A filler ring 64 of non-magnetic material is installed above the magnet 62 flush with the inner pole 58 and the coupling surface 24. As described in the above application, momentary energization of the primary coil 56 reverses the polarity of the magnet 52. Accordingly, in one condition of polarity, an internal magnetic circuit is established. In the other condition of polarity, an external magnetic circuit is established through the mold 12 to provide a shallow saturated magnetic flux height.

The movement sensing system 27 is extremely sensitive and detects the slightest movement of the mold 12 away from the magnet base plate 24. In operation, any physical separation between the mold and the base plate will provide a reduction in the magnetic flux through the magnet 52 and will induce a voltage change in the secondary coil 40 in accordance with well known principles. The induced voltage will be a function of the product of secondary coil turns and rate of flux change versus time. Accordingly it will be appreciated that a small flux change over a short time interval will generate a significant voltage.

The output of the secondary coil 40 is coupled to an amplifier 70 that is coupled with a voltage comparator 72. The comparator 72 coupled to an interlock relay 74 in the molding machine control system 36.

Figure 4:
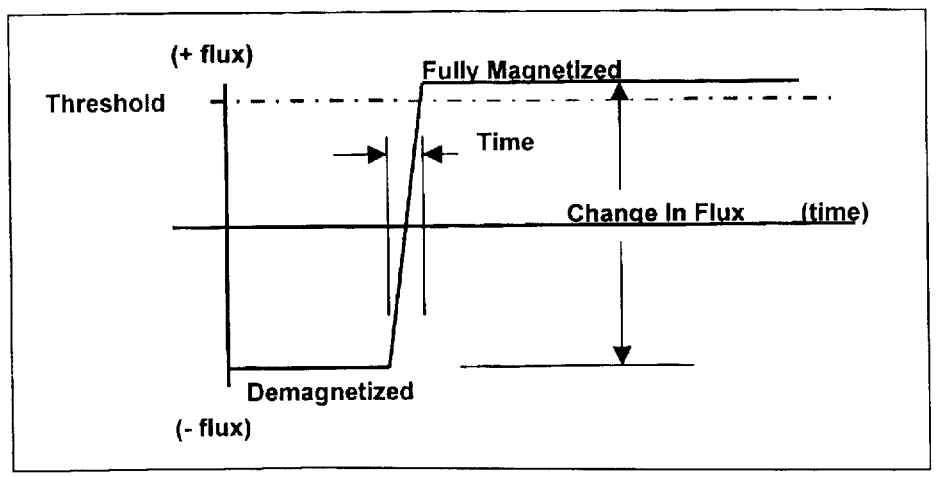
FIG. 4 is a graph depicting the flux change versus time for the sensor system.

The threshold value of the comparator 72 is conventionally established at a desired level. A satisfactory threshold has been utilized at about a minimum of around 14 mV. In operation, if the induced voltage in the secondary coil 40 produces an output voltage from the amplifier 70 at the comparator 72 greater than the selected threshold, the interlock relay 74 of the machine control system 36 is reversely conditioned resulting in an appropriate response by the control system 36, typically preventing further movement or process sequencing until the condition occasioning the emergency condition is examined and/or overcome, and if desired triggering an alarm 75. FIG. 4 depicts the foregoing conditions showing the rate change of flux between the demagnetized, decoupled state and the magnetized coupled state above the threshold indicative of sufficient clamping force.

The present movement sensor system is extremely sensitive. It has been determined in operation that a 3% reduction in flux at magnet 52 over a 5 ms time interval generates a voltage exceeding the above threshold. Further, the threshold may be set such that an impact not causing detectable movement of the mold will signal an emergency condition thereby enabling prediction of potential for later adverse consequences in time to take remedial action in advance thereof. Oftentimes, such a level of sensitivity is not warranted and may be indicative of normal mold flexing or by lesser impacts not significant enough to cause or portend the risk of mold separation. Accordingly, the threshold may be adjusted to allow such discrimination.

The sensor system also includes a magnetic saturation detection mode using the permeability sensing system 28. This feature is synergistic with the above-described movement detection. During magnetization of the clamping system, conditions may nonetheless exist compromising the magnetic permeability of the clamping system and resulting in insufficient clamping forces for initiating or maintaining operations. Exemplary causes are mold material conditions such as lack of adequate thickness, impaired surface finish, material irregularities, warpage, rust, foreign material, the magnetic properties of the mold base material, and the like, any of which can reduce clamping forces. Present control systems may detect poor magnetization due to electrical faults but do not account for inadequate permeability conditions. In addition to use in the movement sensor system, the secondary coil in the sensor magnets is also employed to determine and discriminate permeability conditions.

Therein, the output of the amplifier 70 is coupled to an integrator 80. Prior to magnetization, the integrators are zeroed. After magnetization, the output of the integrators is proportional to the flux change in the magnets 52. The output of the integrator 80 is coupled to a comparator 82. The threshold of the comparator 82 is set at a level indicative of flux that establishes a clamping force sufficient for operations. At such conditions, an interlock 84 for permitting operation is actuated. If the threshold is not met, the alarm 75 is activated initiating a condition that must be examined and resolved prior resuming clamping. Tests have indicated that a gap of about 0.1 mm, between the mold and the mold platen and the clamp, is sufficient to denote insufficient flux. Alternative to the alarm, the controller may automatically demagnetize the clamp.

Prior to final magnetization, it is important for both detection systems that the mold be physically abutting the chuck to enable saturation magnetization. Such relationship is difficult to ascertain visually by the operator. If magnetization is effected with the mold unacceptably remote from the chuck, the circuit will not be saturated but may be sufficient to statically maintain a clamping relationship. However, the level is insufficient to maintain normal operation, and the mold is susceptible to separation from the machine.

In the present invention during mold mounting, a magnet controller 86 coupled between the magnets 44 and the control system 36 initiates a first phase magnetization regardless of the physical relationship between the mold and the clamp. During the first phase magnetization, assuming the distance between the mold and the clamp is not excessive, sufficient force is developed to shift the mold the remaining distance towards the magnetic clamp. A predetermined time thereafter, sufficient for accommodating the needed shifting, a second phase of magnetization is initiated for final clamping. After this second phase magnetization, if the output of the integrator exceeds the threshold of the comparator 82, an interlock 84 for permitting operation is actuated. If the threshold is not exceeded then the magnet controller automatically demagnetizes the clamp and the alarm 75 is activated. This allows the mold to be removed and examined before attempting a further clamping operation. Furthermore, this automatic demagnetization feature prevents the possibility of the clamp being left magnetized without the mold present.

Having thus described a presently preferred embodiment of the present invention, it will now be appreciated that the objects of the invention have been fully achieved, and it will be understood by those skilled in the art that many changes in construction and widely differing embodiments and applications of the invention will suggest themselves without departing from the sprit and scope of the present invention. The disclosures and description herein are intended to be illustrative and are not in any sense limiting of the invention, which is defined solely in accordance with the following claims.

What is claimed:

1. A magnetic clamping system for a mold of an injection molding machine, comprising: a magnet device having a clamping surface for engaging said mold at a clamping interface; a plurality of switchable permanent electromagnets on said magnet device for establishing a magnetic clamping force at said clamping interface, said electromagnets including a coil member; a movement detector sensor system operatively associated with at least one of said electromagnets and including first means for determining changes in magnetic flux conditions at said clamping interface and generating a first caution signal if a threshold value is exceeded; a permeability sensor system operatively associated with at least one of said electromagnets and including second means for determining changes in flux at said between a demagnetized condition and a magnetized condition and generating a second caution signal if said threshold value is not attained; and controller means for receiving said caution signals and determining continued activity of said injection molding machine based thereon.

2. A method for maintaining adequate magnetic forces at an interface between a magnetic clamping device and a workpiece during operations thereat, comprising the steps of: placing an inductive coil in said clamping device adjacent said interface; detecting the change in flux in said coil during said operations; generating a first alert condition if said change in flux exceeds a threshold value; detecting the level of flux in said coil prior to said operations; and generating a second alert condition if said level of flux does not attain a threshold level.

3. A sensor system for determining acceptable magnetization between a magnet device having a switchable magnet generating a magnetic clamping force at a workpiece, comprising: coil means magnetically coupled with said switchable magnet for effecting a voltage output in accordance with magnetic flux conditions between the magnet and the workpiece related to changes in said magnetic clamping force; and control means coupled to said output for providing a control signal based on changes in said flux conditions; and means for initiating a first magnetization of said magnet device, ceasing said first magnetization, and initiating a second magnetization of said magnet device after said ceasing, said control signal being effective only during said second magnetization.

4. The sensor system as recited in claim 3 wherein said control means generates said control signal is changes in said flux conditions exceed a threshold value.

5. The sensor system as recited in claims 4 wherein said control means includes means for varying said threshold value.

6. The sensor system as recited in claim 3 wherein said switchable magnet includes a primary coil and said coil means comprises a secondary coil surrounding said primary coil.

7. The sensor system as recited in claim 6 wherein said magnetic device includes a plurality of switchable magnets, at least one of which includes said secondary coil.

8. The sensor system as recited in claim 7 wherein plural switchable magnets include said secondary coil.

9. The sensor system as recited in claim 7 wherein said workpiece is a mold component for an injection molding machine having a mold cavity and said switchable magnets having said secondary coil are located adjacent said mold cavity.

10. The sensor system as recited in claim 9 wherein changes in said magnetic flux conditions are indicative of separation movement between said workpiece and said magnet devices and said threshold value is less than flux conditions that would decrease said clamping forces below a level maintaining contact between said magnet device and said workpiece.

11. The sensor system as recited in claim 9 wherein said control means includes amplifier means having a input for said control signal and an amplified output, and comparator means having an input for said amplified output and for generating said control signal if said amplified output is above said threshold value.

12. The sensor system as recited in claim 5 wherein said control means determines flux conditions at said secondary coil and generates said control signal if a threshold value is not attained.

13. The sensor system as recited in claim 12 wherein said control means determines the level of flux change between a demagnetized condition for the switchable magnet and a magnetized condition for the switchable magnet and generates said control signal if said threshold value is not attained.

14. The sensor system as recited in claim 13 wherein said control means includes resetting integrator means for receiving said output and generating an output based on said flux change, and comparator means receiving said output and generating said control signal if said threshold value is not attained.

15. The sensor system as recited in claim 3 including a workpiece controller coupled with said control signal for controlling activity of said workpiece in accordance therewith.

16. The sensor system as recited in claim 15 wherein said workpiece controller initiates an alarm if said control signal does not evidence a threshold value.

17. The sensor system as recited in claim 16 wherein said workpiece controller precludes further activity of said workpiece if said control signal does not evidence a threshold value.

18. The sensor system as recited in claim 17 wherein said workpiece controller precludes further activity of said workpiece if said control signal does not attain a threshold value based on said flux conditions.

19. The sensor system as recited in claim 18 wherein said workpiece controller precludes further activity of said workpiece if said control signal exceed a threshold value based on changes in said flux conditions.

20. A sensor system for determining acceptable magnetization between a magnet device having a switchable magnet generating a magnetic clamping force at a workpiece, comprising: coil means magnetically coupled with said switchable magnet for effecting a voltage output in accordance with magnetic flux conditions between the magnet and the workpiece related to changes in said magnetic clamping force; and control means coupled to said output for providing a control signal based on changes in said flux conditions wherein said control means generates said control signal is changes in said flux conditions exceed a threshold value, includes means for varying said threshold value and determines flux conditions at said secondary coil and generates said control signal if a threshold value is not attained, said control means further determining the level of flux change between a demagnetized condition for the switchable magnet and a magnetized condition for the switchable magnet and generates said control signal if said threshold value is not attained; and resetting integrator means for said control means for receiving said output and generating an output based on said flux change, and comparator means receiving said output and generating said control signal if said threshold value is not attained.

21. The sensor system as recited in claim 20 including a workpiece controller coupled with said control signal for controlling activity of said workpiece in accordance therewith.

22. The sensor system as recited in claim 21 wherein said workpiece controller initiates an alarm if said control signal does not evidence a threshold value.

23. The sensor system as recited in claim 22 wherein said workpiece controller precludes further activity of said workpiece if said control signal does not evidence a threshold value.

24. The sensor system as recited in claim 23 wherein said workpiece controller precludes further activity of said workpiece if said control signal does not attain a threshold value based on said flux conditions.

25. The sensor system as recited in claim 24 wherein said workpiece controller precludes further activity of said workpiece if said control signal exceed a threshold value based on changes in said flux conditions.

26. The sensor system as recited in claim 20 wherein said switchable magnet includes a primary coil and said coil means comprises a secondary coil surrounding said primary coil.

27. The sensor system as recited in claim 26 wherein said magnetic device includes a plurality of switchable magnets, at least one of which includes said secondary coil.

28. The sensor system as recited in claim 27 wherein plural switchable magnets include said secondary coil.

29. The sensor system as recited in claim 27 wherein said workpiece is a mold component for an injection molding machine having a mold cavity and said switchable magnets having said secondary coil are located adjacent said mold cavity.

30. The sensor system as recited in claim 29 wherein changes in said magnetic flux conditions are indicative of separation movement between said workpiece and said magnet devices and said threshold value is less than flux conditions that would decrease said clamping forces below a level maintaining contact between said magnet device and said workpiece.

31. The sensor system as recited in claim 29 wherein said control means includes amplifier means having a input for said control signal and an amplified output, and comparator means having an input for said amplified output and for generating said control signal if said amplified output is above said threshold value.

* * * * *